United States Patent [19]
Lee et al.

[11] Patent Number: 5,442,037
[45] Date of Patent: Aug. 15, 1995

[54] POLYESTER PREPOLYMER SHOWING SHAPE-MEMORY EFFECT

[75] Inventors: Chang-Hwang Lee; Jae-Yeon Hwang; Byeong-Seok Chae, all of Seoul, Rep. of Korea

[73] Assignee: Tong Yang Nylon Co., Ltd., Seoul, Rep. of Korea

[21] Appl. No.: 301,766

[22] Filed: Sep. 7, 1994

[51] Int. Cl.$^6$ ............................................. C08G 63/66
[52] U.S. Cl. ................................. 528/301; 528/272; 528/295.3; 528/297; 528/301; 528/306; 528/307; 528/308; 528/308.6
[58] Field of Search .................. 528/272, 295.3, 297, 528/301, 306, 307, 308, 308.6

[56] References Cited

U.S. PATENT DOCUMENTS

| | | | |
|---|---|---|---|
| 3,997,627 | 12/1976 | Ichimura et al. | 526/320 |
| 4,520,161 | 5/1985 | Sassano | 525/11 |
| 4,959,451 | 9/1990 | Uchida et al. | 528/272 |
| 5,178,951 | 1/1993 | Kono et al. | 428/426 |

*Primary Examiner*—Samuel A. Acquah
*Attorney, Agent, or Firm*—Maria Parrish Tungol

[57] ABSTRACT

A shape-memory polyester prepolymer is prepared with at least one kind of dicarboxylic acid component and at least one kind of diol, triol or polyol component in such a way to have unsaturated end group, wherein the dicarboxylic acid component comprises aromatic dicarboxylic acid in an amount of not less than 80% by mole based on the total mole of the dicarboxylic acid component; the diol component comprises a diol containing 2-10 carbon atoms in an amount of not less than 80% by mole based on the total mole of the diol component; a repeating unit of the ester bond ranging in number from 2 to 50; and the end group has crosslinkable, ethylenically unsaturated bond. The prepolymer shows particularly excellent heat resistance and excellent chemical resistance and also exhibits excellent transparency. The prepolymer can be used in a variety of reversible or irreversible purposes, such as pipe coupling, external laminate of pipe, protection ring, O-ring, gap stopper, orthodontic wire, artificial muscles and the like.

8 Claims, No Drawings

POLYESTER PREPOLYMER SHOWING SHAPE-MEMORY EFFECT

BACKGROUND OF THE INVENTION

1. Field of the Invention

The present invention relates, in general, to a polyester prepolymer and, more particularly, to thermosetting polyester prepolymer showing shape-memory effect.

2. Description of the Prior Art

As well known to those skilled in the art, both some alloys and some synthetic resins show shape-memory effect. Known shape-memory alloys are, for example, titanium-nickel alloy, copper-zinc-aluminum alloy and the like. However, the shape-memory alloys are such metals that they are not easy to process and not suitable for mass production of resulting products. Another problem of the shape-memory alloys is in that the shape-memory alloys not only have high specific weight but also are so expensive that they are scarcely generally used. Meanwhile, the shape-memory resin is easily formed, light in weight and shows good processing performance, so that it is known to be suitable for used in mass production of resulting products even though the shape-memory effect of the known shape-memory resin is somewhat less than that of the known shape-memory alloys. The shape-memory resin, after being deformed, recovers to its original shape when it is heated. That is, when the shape-memory resin, after being deformed, is heated to temperatures higher than a predetermined level, the stress imposed on the shape-memory resin when the shape-memory resin was deformed is relieved, thus making the shape-memory resin recovering its original shape.

Japanese Patent Laid-open Publication No. Sho. 61-7336 discloses a method for the preparation of a known shape-memory resin. In accordance with a method of the above Japanese patent, a copolymer of polyamide and polyetheramide containing either multi-functional methacylate or acrylic monomer is cross-linked through radiation, thus to prepare a thermal shape-memory resin. However, the method disclosed in the above Japanese patent has a problem in that the method necessarily includes a post cross-linking step. The crosslinked polymer should become rubber phase so as to be provided with desired processability, however, which rubber phase polymer shows less rigidity around room temperature and are inevitably limited in its use. Another problem of the method of the above Japanese patent is that the resulting thermal shape-memory resin is difficult to mold, thus can be scarcely reused. In addition, it may include a permanently deformed part after heating for recovering the original shape.

Japanese Patent Laid-open Publication No. Sho. 59-535520 discloses polynorbornene that has both a glass transition point of not less than 10° C. and a number average molecular weight of not less than one million. However, the polynorbornene disclosed in this Japanese patent still is a rubber phase material that shows less strength at about room temperature. Another problem of the above polynorbornene is resided in that the high molecular weight of the polynorbornene deteriorates the processability.

Japanese Patent Laid-Open Publication No. Sho. 62-275114 discloses a styrene-butadiene copolymer showing shape-memory effect. However, the styrene-butadiene copolymer has a problem in that the shape-memory effect, as the copolymer is repetitively subjected to deformation and shape recovering, is gradually deteriorated with time.

Japanese Patent Laid-Open Publication No. Sho. 62-192440 discloses a crosslinked trans-polyisoprene showing shape-memory effect. However, the crosslinked trans-polyisoprene, while showing good shape-memory effect, nevertheless is deteriorated in both weatherability and thermal aging resistance due to the diene bond, thus to be inevitably faced with deterioration of physical performance during use of the shape-memory polymer.

SUMMARY OF THE INVENTION

It is, therefore, an object of the present invention to provide shape-memory prepolymer in which the above problems can be overcome and which shows excellent shape-memory effect, heat resistance, chemical resistance, transparency and coloration.

In order to accomplish the above object, the present invention provides a shape-memory polyester prepolymer prepared with at least one kind of dicarboxylic acid component and at least one kind of diol, triol or polyol component in such a way to have unsaturated end, wherein the dicarboxylic acid component comprises aromatic dicarboxylic acid in an amount of not less than 80% by mole based on the total mole of the dicarboxylic acid component; the diol component comprises a diol containing 2-10 carbon atoms in an amount of not less than 80% by mole based on the total mole of the diol component; a repeating unit of the ester bond ranges in number from 2 to 50; and the end has a crosslinkable, ethylenically unsaturated bond.

When the prepolymer according to the present invention is cured through crosslinking the unsaturated end to give a shape of molding product, this product is superior in shape-memory effect.

DESCRIPTION OF THE PREFERRED EMBODIMENTS

The shape-memory polyester prepolymer in accordance with the present invention is prepared with at least one kind of dicarboxylic acid and at least one kind of diol, triol or polyol, in such a manner that the prepolymer has unsaturated end. The shape-memory polyester prepolymer has a repeating unit of the following general formula:

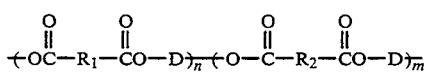

wherein
$R_1$ is an aromatic dicarboxylic acid residue;
$R_2$ is an aliphatic dicarboxylic acid residue;
D is a diol, triol or polyol residue; and
n is an integer of not less than 2, and m is an integer of not less than 0, n and m satisfying the following relation:

$$2 \leq n+m \leq 50.$$

In the above chain, $R_1$ or the residue of aromatic dicarboxylic acid should include meta- or ortho-ester bond that is in a range of not less than 20% by mole based on the total mole of the aromatic dicarboxylic acid.

D should include the triol or the polyol that is in a range of not more than 10% by mole based on the total mole of D. In addition, in D, diol having 2–10 carbon atoms should amount to at least 80% by of total D and, at the same time, at least 20% by mole of the diol having 2–10 carbon atoms should contain at least one oxygen atom in its main chain other than the terminal hydroxy group.

The end of the prepolymer comprises ethylenically unsaturated terminal group in an amount of not less than 50% by mole based on the total mole of the end group.

In a more detailed description of the present invention, aromatic dicarboxylic acid component amounts to not less than 80% by mole of the total dicarboxylic acid component and should include meta- or ortho-ester bond in a range of not less than 20% by mole, preferably not less than 40% by mole, based on the total mole of the aromatic dicarboxylic acid component.

In the diol component, the diol containing 2–10 carbon atoms is present in an amount of at least 80 mole % of the total diol component. At the same time, the diol containing 2–10 carbon atoms should include at least 20% by mole of diol that has at least one oxygen atom at the main chain other than the terminal hydroxyl group.

The shape-memory prepolymer has the repeating units of main chain ranging in number from 2 to 50. The prepolymer also has crosslinkable, ethylenically unsaturated terminal groups. The degree of the substitution of both unsaturated terminal groups is not less than 50% by mole. When number of repeating units of the main chain is less than 2, desired shape-memory effect can not be achieved. On the contrary, when the number of repeating units of the main chain is greater than 50, the shape-memory effect may be deteriorated and fixed deformation of the prepolymer may be not achieved.

Cross-linking of the prepolymer composed of the above components results in a resin showing desired shape-memory effect in which the glass transition point is ranged from 20° to 100° C.

The above shape-memory resin is set so as to have its original shape and, thereafter, deformed at a temperature of not less than the above glass transition point. The deformed shape of resin in turn is fixed at a temperature less than the glass transition point. When using the shape-memory resin, the resin is heated to a temperature not less than the glass transition point, to recover its original shape.

Dicarboxylic acid component suitable for the present invention includes aromatic dicarboxylic acids such as terephthalic acid, isophthalic acid, 2,6-naphthalene dicarboxylic acid; aliphatic dicarboxylic acids such as adipic acid, azelaic acid, sebacic acid, dimeric acid; 1,4 cyclohexane dicarboxylic acid; and the derivatives thereof.

Of the dicarboxylic acid components, aromatic dicarboxylic acid should amount to at least 80% by mole. For example, when the aromatic dicarboxylic acid component is less than 80 mole %, the prepolymer is not provided with the above-described shape-recovering temperature and is deteriorated in both mechanical performance, as elasticity, and heat resistance.

When the aromatic dicarboxylic acid containing the meta-or ortho-ester bond amount to 20% by mole, it will be difficult to deform the prepolymer at less than the glass transition point effect will be deteriorated.

Diol component suitable for the prepolymer of the present invention includes aromatic diols, such as hydroquinone, bis (4-hydroxyphenol)sulfone and 2,2-bis(4-hydroxyphenol)propane; the ethylene oxide adducts thereof; aliphatic diols, such as ethylene glycol, 1,2-propylene glycol, tetramethylene glycol, neopentane glycol, diethylene glycol and triethylene glycol; cyclic diols, such as 1,4-dicyclohexane methanol; polyalkylene glycols, such as polyethylene glycol, polypropylene glycol and polytetramethylene glycol; and the derivatives thereof.

Triol and polyol compounds useful in the present invention include pentaerythritol, glycerol, trimethylolpentane, and 1,3,5-trimethylolbenzene.

In the diol components, the diol containing 2–10 carbon atoms should comprise at least 20% by mole of diol that has at least one atom other than carbon atom at its main chain except for the terminal hydroxyl group. For example, if the content of such a diol is less than 20% by mole, it is difficult to obtain a prepolymer showing the desired shape-memory effect. Furthermore, the less content causes the prepolymer, if any, to be deteriorated in the shape-memory effect. Preferred diol having at least on atom other than carbon atom will be selected from, for example, diethylene glycol and triethylene glycol. When the content of such a diol is not less than 40% by mole, the shape-memory effect of the prepolymer will be more improved.

When at least three compounds are used for the preparation of the shape-memory prepolymer of the present invention, it is preferred to cause two compounds to form the main chain of copolyester and the other to act as a crosslinking functional group. In order to achieve the above object, it is preferred to copolymerize three compounds under the condition that the copolyester comprises the crosslinking functional group in an amount of not more that 20% by equivalent based on the total ester functional group, preferably 10% by equivalent. When the copolyester comprises more than 20% by equivalent, gel may be formed in the copolymerization and, furthermore, the synthesized copolymer has such a high viscosity that the polymer is scarcely molded. More than 20% by equivalent also causes the mechanical strength of the prepolymer to be deteriorated at the temperature not higher than the glass transition point.

Catalyst may be used for the esterification of the compounds for the shape-memory prepolymer. Preferred catalyst includes alkali metal, alkali earth metal and the oxides thereof, weak basic acid, manganese, uranium, zinc, cadmium, zirconium, lead, titanium cobalt, tin oxide, tin hydroxide and inorganic acid salt. The esterification catalyst is also selected from organostannous compounds such as dibutyl tin oxide, dioxtyl tin oxide and dibutyl tin chloride.

The amount of the esterification catalyst used in the synthesis is dependent on the activity of the catalyst, so that it is preferred to add the catalyst in appropriate amount in consideration of esterification rate. The amount of the esterification catalyst is preferably in a range of from approximately 0.0001 to approximately 1% by weight based on the total weight of the dicarboxylic compounds, more preferably from approximately 0.001 to approximately 0.1% by weight.

Synthesis of the prepolymer may be achieved by addition of all compounds at the same time. Alternatively, the synthesis may be achieved through at least two steps so as to cause a desired molecular structure.

It is preferred to range the reaction temperature from about 160° to about 260° C., however, the reaction temperature may be preferably selected depending on the material compounds. When the esterification is to be achieved through at least two steps, the reaction may be carried out at low temperature at the initial stage in consideration of boiling points of the material compounds and, thereafter, the reaction temperature is gradually increased so as to accomplish the synthesis. Since the reaction is for prepolymer, most of the reaction may reach desired level, however, it is difficult to achieve desired level of reaction when the repeating unit becomes longer. In latter case, either unreacted materials or by-products may be included in the resulting prepolymer. However, since the influence by either the unreacted materials or the by-products is negligible, the resulting prepolymer may be industrially used without further refinement. Meanwhile, when the resulting prepolymer with either the unreacted materials or the by-products is refined prior to use, the characteristics are improved in cracking or repeated use. In this regard, the unreacted material or the side reaction product is preferably removed from the resulting prepolymer through distillation under reduced pressure, especially, using a thin layer distiller that shows high efficiency in removing low viscosity material from high viscosity material. The prepolymer prepared through the above-described process is cured by means of the unsaturated terminal group, prior to use.

Curing agent suitable to cure the prepolymer of the present invention may be selected from radical catalysts. The radical catalysts are, for example, azo compounds such as 2,2′-azo-bisisovaleronitrile; ketone peroxides such as methylethyl ketone peroxide, methylisobutyl ketone peroxide and cyclohexanone peroxide; diacyl peroxides such as benzoyl peroxide, 2,4-dichlorobenzoyl peroxide, lauroyl peroxide and para-benzoyl peroxide; hydroperoxides such as 2,4,4-trimethyl pentyl-2-hydroperoxide, cumine hydroperoxide and t-butyl peroxide; dialkyl peroxides such as dicumyl peroxide, t-butylcumyl peroxide, di-t-dibutyl peroxide and tris(t-butyl peroxide)triazine; peroxyketals such as 1,1-di-t-butyl peroxycyclohexane and 2,2-di(t-butyl peroxy)butane; alkyl peroxyesters such as t-butyl peroxypivalate, t-butylperoxy-2-ethyl hexanoate, t-butylperoxy hexahydroterephthalate, di-t-butylperoxy acetate, t-butylperoxy-3,5,5-trimethyl hexanoate, t-butylperoxy acetate, t-butylperoxy benzoate and di-t-butylperoxy trimethyladipate; and percarbonates such as diisopropylperoxy dicarbonate, di-s-butylperoxy carbonate and t-butylperoxy isopropylcarbonate.

The unsaturated terminal group is introduced through esterification. Examples of compounds for the introduction of unsaturated terminal group are alcohol or acid having unsaturated group. It is preferred to use compounds having ethylenically unsaturated group as the compounds for the introduction of the unsaturated terminal group. Such ethylenically unsaturated compounds includes alkenols such as 3-buten-1-ol, 3-buten-2-ol, 1-penten-3-ol, 3-penten-2-ol, 2-propen-1-ol, 1-hexen-3-ol, t-2-hexen-1-ol, cis-3-hexen-1-ol, t-3-hexen-1-ol, 4-hexen-1-ol and 5-hexen-1-ol. Alternatively, the compounds for the introduction of the unsaturated terminal group may be selected from acids with unsaturated group, such as vinylacetic acid, arylacetic acid, 2-octenoic acid and 6-heptenoic acid.

As a further alternative, such diarylphthalate diarylisophthalate and diarylterephthalate that have unsaturated group can be used. After the ester interchange, these compounds can leave the unsaturated group in the prepolymer by appropriate adjustment of the reaction molar ratio.

In order to improve the shape-memory effect, polyakylene glycol having a number average molecular weight of 300 to 6,000, as the diol component, is preferably used in an amount of approximately 0.1 to approximately 10% by mole based on the total mole of diol component. For example, if too little polyalkylene glycol is used, the shape memory effect of the prepolymer is scarcely improved. On the other hand, when the content of polyalkylene glycol component is higher than 10% by mole based on the total mole of diol component, the glass transition point is lower than a predetermined level, so that the prepolymer becomes an elastic body at room temperature, which elastic body can be scarcely used as the shape-memory resin. Therefore, the amount of polyalkylene glycol component should be determined in consideration of its effect on the glass transition point.

In addition, the shape-memory prepolymer of this invention may further comprise another compound capable of esterification. For example, aliphatic or aromatic oxycarboxylic acids, such as ε-caprolactone and 4-oxybenzoic acid, and the derivatives thereof; and pentaerythritol, glycerol, trimethylolpentane, 1,3,5-trimethylolbenzene and trimellitic acid each may be used to synthesize the shape-effect prepolymer according to the present invention.

In the present invention, it is preferred to range the curing catalyst from approximately 0.01 to approximately 10% by weight, preferably from approximately 0.1 to approximately 5% by weight, based on the total weight of the reactants.

When the repeating unit is enlarged, the viscosity of the prepolymer is so increased that typical agitation can not achieve homogeneous kneading of the curing agent. In this case, the curing agent should be kneaded using a kneader or roll mill in the same manner as kneading of rubber. This substance prepared by the compounding process may be used for extrusion or compression molding in the same manner as rubber.

When the prepolymer of the invention is cured to give a resin, the resin may be repeatedly deformed and recover its original shape. In order to assure the shape-memory effect of the resin according to the present invention, the deformed shape of the resin should be fixed at a temperature lower than the glass transition point. In addition, the resin, after being deformed, should recover its original shape at a temperature not lower than the glass transition point. Furthermore, the resin should not be changed in its shape when the compound is left at a temperature not higher than the glass transition point.

That is, the resin cannot show desired shape-memory effect when it is unstable or not fixed in its deformed shape at a temperature lower than the glass transition point or it does not recover its original shape at a temperature not lower than the glass transition point. However, when the resin can be deformed and fixed in its deformed shape at a temperature lower than the glass transition point and recover its original shape at a temperature not lower than the glass transition point, it shows the desired shape-memory effect.

The prepolymer of the present invention may be added with additives such as ultraviolet resisting agent, flame-retardant and pigment or may be blended or compounded with other high polymers to a degree that the shape-memory effect of the present invention is not affected.

With superior shape-memory effect, the prepolymer according to the present invention shows particularly excellent heat resistance and excellent chemical resistance in comparison with the prior shape-memory thermosetting resins. The present shape-memory resin also exhibits excellent transparency and thus, has significant advantages in coloration over the prior shape-memory resins. With the excellent transparency, the shape-memory compound of this invention may be profitably used in production of molding products needing transparency.

Taking advantage of the shape-memory effect, the shape-memory prepolymer of the present invention can be used in reversible or irreversible purpose. More specifically, the shape-memory prepolymer of this invention can be profitably used for pipe coupling, internal lining of pipe, external laminate of pipe, protection ring, O-ring, gap stopper, varieties of cover materials, packing ribbon, orthodontic wire, cast plaster, artificial muscles, automobile seats, varieties of leisure goods, heels of the shoes, spectacles frame, goggle, brush, fishing line, textiles, films, Y-shirts, artificial flower, accessories and toys.

The following example and comparative examples are merely intended to the illustrate the present invention is further detail and should by no means be considered to be limitative of the invention. The % by mole in the Examples is based on the total mole of reactants.

EXAMPLE 1

54.5% by mole of diallylisophthalate, 27.5% by mole of diethylene glycol and 18.2% by mole of butylene glycol were reacted in a suction reactor in the presence of an esterification catalyst of monobutylene tin oxide amounting to 0.05% by weight of the diallyisophthalate. The reaction was carried out at 230° C. for at least 4 hours while draining allyl alcohol out of the reactor. When no allyl alcohol was drained out of the reactor, the pressure of the reactor was reduced to not more than 50 mmHg for about 1 hour, thus to complete the reaction. As a result of the reaction, a prepolymer was given. While being cooled, the prepolymer was discharged from the reactor.

2 parts by weight of dicumylperoxide as a curing agent was added to 100 parts by weight of the prepolymer prepared and, thereafter, stirred for 10 minutes at a temperature of 80° C. while reducing the pressure to not higher than 50 mmHg. Bubbles was removed. The liquid prepolymer comprising the curing agent in turn was poured into a mold and cured for at least 5 hours at a temperature of 130° C. Thereafter, the mold was removed to form a desired shape of molding product showing shape-memory effect.

EXAMPLES 2 THROUGH 12

A prepolymer was prepared in a manner similar to that of Example 1, except that the components and amounts were employed as given in the following Table 1.

EXAMPLES 13 AND 14

The procedure of Example 1 was repeated, except that the components and amounts were changed as given in the following Table 1. While the procedure being carried out, methanol generated in reaction was removed and efficient separatory column was employed so as not to discharge allylalcohol from the reaction system.

COMPARATIVE EXAMPLES 1 THROUGH 12

The procedure of Example 1 was repeated, except that the components and amounts was employed as given in the following Table 2.

The prepolymers obtained, after being cured, of the above Examples and Comparative Examples were tested for shape-memory effect and the measurements are given as shown in Tables 3 and 4.

<MEASUREMENT OF SHAPE-MEMORY EFFECT>

A specimen of the prepolymer that was 10 mm wide, 4 mm thick and 150 mm long was left in a water reservoir for at least 5 minutes at a temperature higher than the glass transition point by at least 10° C. and, then, deformed into a circle. The prepolymer circle in turn was immersed in a water reservoir at a temperature lower than the glass transition point by at least 10° C., thus to fix it at the deformed shape. The shape-memory effect of the specimen was measured while heating the deformed and fixed specimen. The shape-memory effect of the specimen are expressed on the basis of the completion of recovery of the original shape at temperatures not lower than the glass transition point.

In tables 3 and 4,
at least 95% of recovery of original shape:
5–25% of remaining deformed shape: Δ
at least 25% of remaining deformed shape: X

TABLE 1

Synthesis of Prepolymer unit: mol %

| Exam. No. | Dicarboxylic Acid | | | | | Alcohol | | | | | | |
|---|---|---|---|---|---|---|---|---|---|---|---|---|
| | DAP | DAIP | DATP | DMT | DMIT | DEG | TEG | EG | BG | HD | AAL | BA |
| 1 | | 54.5 | | | | 27.3 | | | 18.2 | | | |
| 2 | | 54.5 | | | | 36.4 | 9.1 | | | | | |
| 3 | | 54.5 | | | | 40.9 | | | | 4.6 | | |
| 4 | | 27.3 | 27.3 | | | 33.1 | | | 12.3 | | | |
| 5 | | 36.4 | 18.2 | | | 45.5 | | | | | | |
| 6 | | 43.6 | 11.0 | | | | 45.5 | | | | | |
| 7 | | 60.0 | | | | | 40.0 | | | | | |
| 8 | | 50.5 | | | | 49.5 | | | | | | |
| 9 | 11.1 | 41.3 | | | | 47.6 | | | | | | |
| 10 | 6.2 | 48.3 | | | | 45.5 | | | | | | |
| 11 | | 58.3 | | | | 41.7 | | | | | | |
| 12 | | 60.0 | | | | 40.0 | | | | | | |
| 13 | | | | | 46.2 | 38.5 | | | | | 15.3 | |

TABLE 1-continued

Synthesis of Prepolymer unit: mol %

| Exam. No. | Dicarboxylic Acid | | | | | Alcohol | | | | | | |
|---|---|---|---|---|---|---|---|---|---|---|---|---|
| | DAP | DAIP | DATP | DMT | DMIT | DEG | TEG | EG | BG | HD | AAL | BA |
| 14 | | | 23.5 | 23.5 | | 41.2 | | | | | | 11.8 |

*DAP: diallyl phthalate
DATP: diallyl terephthalate
DMIT: dimethyl isophthalate
TEG: triethylene glycol
BG: butylene glycol
AAL: allyl alcohol
DAIP: diallyl isophthalate
DMT: dimethyl terephthalate
DEG: diethylene glycol
EG: ethylene glycol
HD: hexane diol
BA: 3-buten-1-ol

TABLE 2

Synthesis of Prepolymer unit: mol %

| C. Exam. No. | Dicarboxylic Acid | | | | | Alcohol | | | | | | | | |
|---|---|---|---|---|---|---|---|---|---|---|---|---|---|---|
| | DAP | DAIP | DATP | DMT | DMIT | DEG | TEG | EG | BG | HD | NPG | PTMG | PEG | AAL |
| 1 | | | 54.5 | | | 27.3 | | | 18.2 | | | | | |
| 2 | | 49.5 | | | | 50.5 | | | | | | | | |
| 3 | | 54.5 | | | | | | | | 45.5 | | | | |
| 4 | | 27.3 | 27.3 | | | | | | | | 45.4 | | | |
| 5 | | 5.4 | 49.1 | | | 45.5 | | | | | | | | |
| 6 | | 54.6 | | | | 7.3 | | | 38.2 | | | | | |
| 7 | 6.7 | | 47.8 | | | | | 45.5 | | | | | | |
| 8 | | 54.5 | | | | | | | 23.2 | | | 22.3 | | |
| 9 | | 54.5 | | | | 23.2 | | | | | | | 22.3 | |
| 10 | | 66.5 | | | | 33.5 | | | | | | | | |
| 11 | | 51.0 | | | | | 49.0 | | | | | | | |
| 12 | | 60.0 | | 23.5 | 23.5 | | | 3.1 | 38.1 | | | | | 11.8 |

*DAP: diallyl phthalate
DATP: diallyl terephthalate
DMIT: dimethyl isophthalate
TEG: triethylene glycol
BG: butylene glycol
HD: hexane diol
NPG: neopentylene glycol
DAIP: diallyl isophthalate
DMT: dimethyl terephthalate
DEG: diethylene glycol
EG: ethylene glycol
PTMG: polytetramethylene glycol (Mw 2,000)
PEG: polyethylene glycol (Mw 2,000)
AAL: allyl alcohol

TABLE 3

Characteristics of Prepolymer cured*

| Exam. No. | Tg (°C.) | Shape-Memory Effect | Shape Recovery Rate (%) |
|---|---|---|---|
| 1 | 38 | ○ | 100 |
| 2 | 40 | ○ | 100 |
| 3 | 35 | ○ | 100 |
| 4 | 35 | ○ | 100 |
| 5 | 34 | ○ | 100 |
| 6 | 35 | ○ | 100 |
| 7 | 25 | ○ | 98 |
| 8 | 24 | ○ | 99 |
| 9 | 25 | ○ | 97 |
| 10 | 31 | ○ | 97 |
| 11 | 40 | ○ | 98 |
| 12 | 57 | ○ | 99 |
| 13 | 42 | ○ | 100 |
| 14 | 35 | ○ | 100 |

*curing condition: 2 parts by weight of dicumyl peroxide per 100 parts by weight of the prepolymer, 130° C., at least 5 hours

TABLE 4

Characteristics of Prepolymer cured

| C. Exam. No. | Tg (°C.) | Shape-Memory Effect | Shape Recovery Rate (%) |
|---|---|---|---|
| 1 | 41 | △ | 100 |
| 2 | 24 | △ | 100 |
| 3 | 50 | X | 100 |
| 4 | 45 | X | 100 |
| 5 | 39 | △ | 100 |
| 6 | 38 | X | 100 |
| 7 | 65 | X | 98 |
| 8 | −40 | ○ | 99 |
| 9 | −10 | ○ | 97 |
| 10 | 25 | X | 97 |
| 11 | 2 | ○ | 98 |
| 12 | 35 | △ | 99 |

*curing condition: 2 parts by weight of dicumyl peroxide per 100 parts by weight of the prepolymer, 130° C., at least 5 hours Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A shape-memory polyester prepolymer prepared with at least one kind of dicarboxylic acid component and at least one kind of diol component to have unsaturated end group, wherein the dicarboxylic acid component comprises aromatic dicarboxylic acid in an amount of not less than 80% by mole based on the total mole of the dicarboxylic acid component; the diol component comprises a diol containing 2-10 carbon atoms in an amount of not less than 80% by mole based on the total mole of the diol component, and wherein the prepolymer has a repeating unit ranging in number from 2 to 50 and the end group of the prepolymer contains crosslinkable, ethylenically unsaturated bond.

2. A shape-memory polyester prepolymer according to claim 1, wherein said diol containing 2-10 carbon atoms comprise at least 20% by mole of diol that has at least one oxygen atom in its main chain other than the terminal hydroxyl group.

3. A shape-memory polyester prepolymer according to claim 2, wherein said unsaturated end group contains cross-linkable, ethylenically unsaturated bond in an amount of at least 50% by mole based on the total moles of unsaturated end groups.

4. A shape-memory polyester prepolymer according to claim 1, wherein said unsaturated end group contains crosslinkable, ethylenically unsaturated bond in an amount of at least 50% by mole based on the total moles of the unsaturated end groups.

5. A shape-memory polyester prepolymer according to claim 1, wherein said aromatic dicarboxylic acid comprises meta- or ortho-bonds in an amount of not less than 20% by mole based on the total moles of said aromatic dicarboxylic acid.

6. A shape-memory polyester prepolymer according to claim 5, wherein said diol containing 2-10 carbon atoms comprise at least 20% by mole of diol that has at least one oxygen atom in its main chain other than the terminal hydroxyl group.

7. A shape-memory polyester prepolymer according to claim 5, wherein said unsaturated end groups contain crosslinkable, ethylenically unsaturated bond in an amount of at least 50% by mole based on the total moles of the unsaturated end group.

8. A shape-memory polyester prepolymer according to claim 1, wherein the diol component further comprises triol or polyol.

* * * * *